(12) United States Patent
Chen et al.

(10) Patent No.: US 12,112,531 B2
(45) Date of Patent: Oct. 8, 2024

(54) IMAGE RECOGNITION METHOD AND APPARATUS, AND DEVICE AND MEDIUM

(71) Applicant: SUZHOU METABRAIN INTELLIGENT TECHNOLOGY CO., LTD., Jiangsu (CN)

(72) Inventors: Jingjing Chen, Jiangsu (CN); Ruizhen Wu, Jiangsu (CN); Ping Huang, Jiangsu (CN); Lin Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/565,043

(22) PCT Filed: Apr. 26, 2022

(86) PCT No.: PCT/CN2022/089350
§ 371 (c)(1),
(2) Date: Nov. 28, 2023

(87) PCT Pub. No.: WO2023/092938
PCT Pub. Date: Jun. 1, 2023

(65) Prior Publication Data
US 2024/0257512 A1    Aug. 1, 2024

(30) Foreign Application Priority Data

Nov. 24, 2021  (CN) .......................... 202111398690.7

(51) Int. Cl.
*G06V 10/82*         (2022.01)
*G06F 18/00*         (2023.01)
(Continued)

(52) U.S. Cl.
CPC .................................. *G06V 10/82* (2022.01)

(58) Field of Classification Search
CPC ...................................................... G06V 10/82
See application file for complete search history.

(56) References Cited

U.S. PATENT DOCUMENTS

| 2019/0370532 A1* | 12/2019 | Soni ..................... H04N 23/611 |
| 2020/0264876 A1* | 8/2020 | Lo ........................... G06N 3/084 |
| 2021/0158549 A1* | 5/2021 | Veeravasarapu ....... G06N 3/045 |

FOREIGN PATENT DOCUMENTS

| CN | 104537387 A | 4/2015 |
| CN | 106056595 A | 10/2016 |

(Continued)

OTHER PUBLICATIONS

Hua Liu. "Adaptive Activation Functions in Deep Convolutional Networks." A thesis for master's degree. South China University of Technology. Mar. 2018.

*Primary Examiner* — John W Lee
(74) *Attorney, Agent, or Firm* — IPro, PLLC

(57) ABSTRACT

A method of image recognition includes: acquiring an image training sample data set, where the image training sample data set includes image training sample data and tag information corresponding to the image training sample data; constructing basic activation function and preset bias adjustment function as preset activation function in an addition relationship, determining the preset activation function to be an activation function of a neural network model, to obtain an initial neural network model, where the preset bias adjustment function is a function constructed from a symbol function, a first trainable parameter and a quadratic term in a multiplication relationship; inputting the image training sample data set into the initial neural network model for training until the model converges, to obtain a trained neural network model; when an image to be recognized is acquired, outputting a recognition result corresponding to the image by using the trained neural network model.

17 Claims, 5 Drawing Sheets

(51) Int. Cl.
     *G06F 18/214*     (2023.01)
     *G06N 3/045*      (2023.01)
     *G06N 3/047*      (2023.01)
     *G06N 3/048*      (2023.01)
     *G06N 3/08*        (2023.01)

(56) References Cited

FOREIGN PATENT DOCUMENTS

| | | |
|---|---|---|
| CN | 106845401 A | 6/2017 |
| CN | 108898213 A | 11/2018 |
| CN | 110059741 A | 7/2019 |
| CN | 111091175 A | 5/2020 |
| CN | 112613581 A | 4/2021 |
| CN | 113822386 A | 12/2021 |
| KR | 20190048274 A | 5/2019 |

\* cited by examiner

IMAGE RECOGNITION METHOD AND APPARATUS, AND DEVICE AND MEDIUM

CROSS-REFERENCE TO RELATED APPLICATION

The present application claims the priority of Chinese patent application filed on Nov. 24, 2021 before the China National Intellectual Property Administration with the application number of 202111398690.7, and the title of "METHOD AND APPARATUS OF IMAGE RECOGNITION, AND DEVICE AND MEDIUM", which is incorporated herein in its entirety by reference.

FIELD

The present application relates to the technical field of artificial intelligence and, more particularly, to a method and an apparatus of image recognition, and device and medium.

BACKGROUND

With the development of artificial intelligence technology, how to perform image recognition by using an artificial neural network model is widely studied. An activation function is a function added to an artificial neural network, to help a network to learn complex patterns in data. At present, the gradients of universal activation functions sigmoid and tanh (that is, a hyperbolic tangent function) are gradually approaching zero at both ends. Therefore, with the increase of depth, the magnitude caused by their calculation becomes smaller and smaller, and finally the gradient disappears, thus the convergence speed of a model and the accuracy of the image recognition are affected.

SUMMARY

According to a first aspect, the present application discloses a method of image recognition, including:
acquiring an image training sample data set; where the image training sample data set includes image training sample data and tag information corresponding to the image training sample data;
constructing a basic activation function and a preset bias adjustment function as a preset activation function in an addition relationship, and determining the preset activation function to be an activation function of a neural network model, to obtain an initial neural network model; where, the preset bias adjustment function is a function constructed from a symbol function, a first trainable parameter and a quadratic term in a multiplication relationship;
inputting the image training sample data set into the initial neural network model for training until the model converges, to obtain a trained neural network model; and
when an image to be recognized is acquired, outputting a recognition result corresponding to the image to be recognized by using the trained neural network model.

According to an embodiment of the present application, the step of, constructing the basic activation function and the preset bias adjustment function as the preset activation function in the addition relationship, includes:
constructing the basic activation function, the preset bias adjustment function and a preset linear function as an activation function in the addition relationship, to obtain the preset activation function;

where, the preset linear function includes a second trainable parameter.

According to an embodiment of the present application, the step of, constructing the basic activation function, the preset bias adjustment function and the preset linear function as the activation function in the addition relationship, to obtain the preset activation function, includes:
constructing the basic activation function, the preset bias adjustment function and the preset linear function as the activation function in the addition relationship according to a trainable weight parameter, to obtain the preset activation function.

According to an embodiment of the present application, the preset activation function is:

$$\phi(x, \alpha, a, b) = \alpha * h(x) + (1 - \alpha) * [u(x) + \eta(x)]$$

where $h(x)$ is the basic activation function, $u(x)$ is the preset linear function, $\eta(x)$ is the preset bias adjustment function, $\alpha$ is the trainable weight parameter, and $$u(x) = b * x + c$$
$$\eta(x) = \text{sign}(x) * a * x^2$$

where, b and c are the second trainable parameters, and a is the first trainable parameter.

According to an embodiment of the present application, the basic activation function is a hyperbolic tangent function or a sigmoid function.

According to an embodiment of the present application, the step of, determining the preset activation function to be the activation function of the neural network model, to obtain the initial neural network model, includes:
determining the preset activation function to be an activation function of a recurrent neural network model, to obtain the initial neural network model.

According to an embodiment of the present application, after the step of, inputting the image training sample data set into the initial neural network model for training until the model converges, to obtain the trained neural network model, the method further includes:
acquiring a test data set;
inputting the test data set into the trained neural network model, to obtain a test result corresponding to the test data set; and
evaluating accuracy of the trained neural network model by using the test result.

According to a second aspect, the present application discloses an image recognition apparatus, including:
a training sample data acquisition module, configured for acquiring an image training sample data set; where the image training sample data set includes image training sample data and tag information corresponding to the image training sample data;
an initial neural network model acquisition module, configured for constructing a basic activation function and a preset bias adjustment function as a preset activation function in an addition relationship, and determining the preset activation function to be an activation function of a neural network model, to obtain an initial neural network model; where, the preset bias adjustment function is a function constructed from a symbol function, a first trainable parameter and a quadratic term in a multiplication relationship;

a neural network model train module, configured for inputting the image training sample data set into the initial neural network model for training until the model converges, to obtain a trained neural network model; and an image recognition module, configured for when an image to be recognized is acquired, outputting a recognition result corresponding to the image to be recognized by using the trained neural network model.

According to a third aspect, the present application discloses an electronic device, including a memory and one or more processors, where a computer-readable instruction is stored in the memory, and the computer-readable instruction, when executed by the one or more processors, causes the one or more processors to perform the steps of the method of image recognition.

According to a fourth aspect, the present application discloses One or more non-transitory computer-readable storage media storing a computer-readable instruction, where the computer-readable instruction, when executed by one or more processors, causes the one or more processors to perform the steps of the above-mentioned method of image recognition.

Details of one or more embodiments of the present application are set forth in the following drawings and description. Other features and advantages of the present application will be apparent from the description, drawings and claims.

BRIEF DESCRIPTION OF THE DRAWINGS

In order to illustrate the technical solutions of the embodiments of the present application or the related art more clearly, the drawings that are required in the description of the embodiments or the related art will be briefly introduced below. Apparently, the drawings in the following description are merely some embodiments of the present application, and other drawings may be obtained according to these drawings without creative work for a person skilled in the art.

DETAILED DESCRIPTION

The technical solutions in the embodiments of the present application will be clearly and completely described with reference to the drawings in the embodiments of the present application below. Apparently, the described embodiments are merely a portion of the embodiments of the present application, but not all the embodiments. Based on the embodiments of the present application, all other embodiments obtained by a person skilled in the art without creative work belong to the protection scope of the present application.

With the development of artificial intelligence technology, how to perform image recognition by using an artificial neural network model is widely studied. An activation function is a function added to an artificial neural network, to help a network to learn complex patterns in data. At present, the gradients of universal activation functions sigmoid and tanh (that is, a hyperbolic tangent function) are gradually approaching zero at both ends. Therefore, with the increase of depth, the magnitude caused by their calculation becomes smaller and smaller, and finally the gradient disappears, thus the convergence speed of a model and the accuracy of the image recognition are affected. Consequently, the present application provides an image recognition solution, which is capable to avoid gradient disappearance, thus the convergence speed of the model and the accuracy of image recognition are improved.

Figure 1:
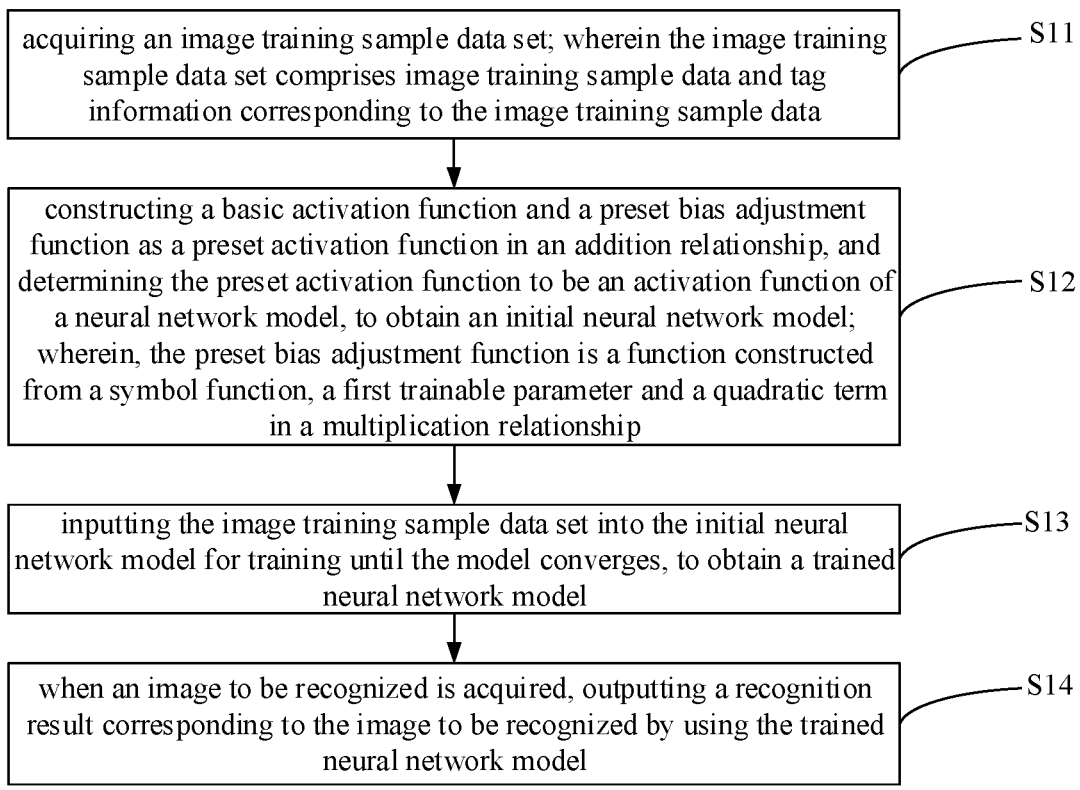
FIG. 1 is a flow chart of a method of image recognition according to one or more embodiments of the present application.

Referring to FIG. 1, an embodiment of the present application discloses a method of image recognition, the method includes:

S11: Acquiring an image training sample data set; among them, the image training sample data set includes image training sample data and tag information corresponding to the image training sample data.

In an embodiment, a MNIST data set may be obtained, and a portion of data thereof are used as the image training sample data set, and the other portion of the data are used as a test set. Certainly, in some other embodiments, other data sets are used as training sets.

Figure 2:
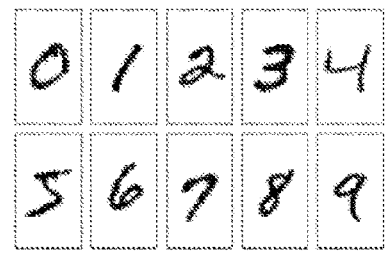
FIG. 2 is an example diagram of a MNIST data set according to one or more embodiments of the present application.

It should be pointed out that, the MNIST data set is a classic small-scale image classification data set, which counts 250 pictures of handwritten numbers from different people, among them, 50% are senior high school students, and 50% are from staffs of the Census Bureau. The purpose of collecting this data set is to realize the recognition of the handwritten number through an algorithm. The MNIST contains 70,000 pictures of the handwritten numbers, every picture is composed of 28×28 pixels, and every pixel is represented by a grayscale value. The embodiment of the present application may take 60,000 samples as a training data set and 10,000 samples as a test data set. Every sample has its corresponding label, which is represented by a single decimal number and corresponds to the corresponding category of the picture. This data set is widely used in the fields of machine learning and deep learning, to test the effect of algorithms, for example a Linear Classifiers, a K-nearest neighbors, a support vector machines (SVMs), a neural net, a convolutional net and so on. For example, referring to FIG. 2, which is an example diagram of a MNIST data set according to an embodiment of the present application.

S12: Constructing a basic activation function and a preset bias adjustment function as a preset activation function in an addition relationship, and determining the preset activation function to be an activation function of a neural network model, to obtain an initial neural network model; among them, the preset bias adjustment function is a function constructed from a symbol function, a first trainable parameter and a quadratic term in a multiplication relationship.

In an embodiment, an activation function may be constructed from the basic activation function, the preset bias adjustment function and a preset linear function in the addition relationship, to obtain the preset activation function; among them, the preset linear function includes a second trainable parameter.

Further, the embodiments of the present application may construct the basic activation function, the preset bias adjustment function and the preset linear function as the activation function in the addition relationship according to a trainable weight parameter, to obtain the preset activation function.

In an embodiment, the preset activation function is:

$$\phi(x, \alpha, a, b) = \alpha * h(x) + (1 - \alpha) * [u(x) + \eta(x)]$$

among them, $h(x)$ is the basic activation function, $u(x)$ is the preset linear function, $\eta(x)$ is the preset bias adjustment function, a is the trainable weight parameter, and $$u(x) = b * x + c$$

$$\eta(x) = \text{sign}(x) * a * x^2$$

among them, b and c are the second trainable parameters, and a is the first trainable parameters.

It may be understood that, taking the derivative of $u(x)$ yields: $u(x)'=b$, so that $u(x)$ is used to move the basic activation function, to make it meet the maximum gradient in the place where the data is densely distributed, thus obtaining an activation function containing trainable parameters that may be trained according to the model, tasks and the distribution of data, thus the convergence speed and accuracy of the model are improved. In addition, taking the derivative of $\eta(x)$ yields:

$$\eta(x)' = 2 * \text{sign}(x) * a * x$$

In this way, a bias proportional to the x value is added to the gradient, and when x approaches both ends, the disappearance of the gradient is capable to be effectively avoided.

Among them, the basic activation function is a hyperbolic tangent function or a sigmoid function.

It should be pointed out that, the existing universal activation function has a fixed function form and its parameters are fixed and untrainable. In the embodiment of the present application, the activation function is constructed as a function having a fixed structure, but its parameters, like parameters of a nerve network, may be trained according to the model, tasks and the distribution of data. Therefore, based on the original universal activation function, the embodiment of the present application proposes an activation function having trainable parameters that may be trained according to the models, tasks and the distribution of data, and the problem of the disappearance of the gradient is considered in the construction process.

In addition, in an embodiment, the preset activation function may be determined as the activation function of a recurrent neural network model in the embodiment of the present application, to obtain the initial neural network model.

It should be pointed out that, the situation of gradient disappearance is more obvious in a Recurrent Neural Network (RNN). Therefore, the embodiment of the present application adopts the recurrent neural network model, but in some other embodiments, it may be applied to other neural network models to solve the problem of gradient disappearance.

Figure 3:
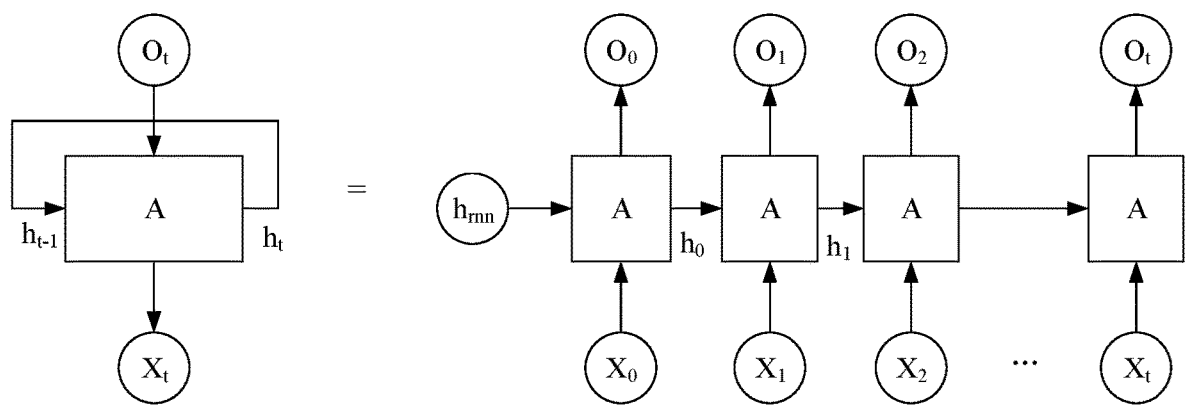
FIG. 3 is a structural schematic diagram of a recurrent neural network according to one or more embodiments of the present application.

Referring to FIG. 3, FIG. 3 is a structural schematic diagram of a recurrent neural network according to an embodiment of the present application. On a left side of the equal sign is a schematic diagram of the recurrent neural network model not being unfolded according to a time sequence, and on the right side of the equal sign is a schematic diagram of the recurrent neural network model being unfolded according to the time sequence. FIG. 3 describes a model of the RNN near a time sequence index number t. Among them, $x_t$ represents an input of a training sample at the sequence index number t. Similarly, $x_{t-1}$ and $x_{t+1}$ represent inputs of the training samples at sequence index numbers t−1 and t+1. $h_t$ represents a hidden state of the model at the sequence index number t. $h_t$ is jointly determined by $x_t$ and $h_{t-1}$. $o_t$ represents an output of the model at the sequence index number t. $o_t$ is merely determined by the current hidden state $h_t$ of the model. The following is a strict mathematical definition of a classical RNN structure:

the inputs are $x_1, x_2, x_3, \ldots x_t$, and the corresponding hidden states are $h_1, h_2, \ldots h_t$;

the outputs are $y_1, y_2, \ldots y_t$, for example, the operation process of the classical RNN may be expressed as:

$$h_t = f(Ux_t + Wh_{t-1} + b)$$

$$y_t = \text{softmax}(Vh_t + c).$$

Among them, U, W, V, b, c are all parameters, and f(•) represents the activation function, which is generally the tanh function.

That is, the embodiment of the present application takes the classic RNN as an example, replaces the activation function in the classic RNN with the preset activation function according to the present application, and uses the RNN to realize MNIST handwriting classification. The network structure is as follows:

Input: 28*28;
A first layer: RNN(100, activation='tanh', return_sequences=True);
A second layer: RNN(200, activation='tanh', return_sequences=True);
A third layer: RNN(50, activation='tanh');
A fourth layer: Dense(100)
A fifth layer: Dense(10)
a sixth layer: softmax
A loss function: a cross entropy loss function, torch.nn.CrossEntropyLoss, which depicts a distance between an actual output ŷ and an expected output y, among them, n is a batchsize and i represents the i-th sample data:

$$L = -\frac{1}{n}\sum_{i=1}^{n}(y_i \log \hat{y}_i + (1-y_i)\log(1-\hat{y}_i))$$

Adam is selected as an optimize.

S13: Inputting the image training sample data set into the initial neural network model for training until the model converges, to obtain a trained neural network model.

In the process of training, a training loss is calculated, and the model is updated based on the loss until the model converges, and the trained neural network model is obtained.

Further, acquiring a test data set; inputting the test data set into the trained neural network model, to obtain a test result corresponding to the test data set; and evaluating accuracy of the trained neural network model by using the test result.

As may be seen from the foregoing content, in the embodiment of the present application, a portion of data in the MNIST data set may be used as a test set to evaluate the accuracy of the trained neural network model.

Figure 4:
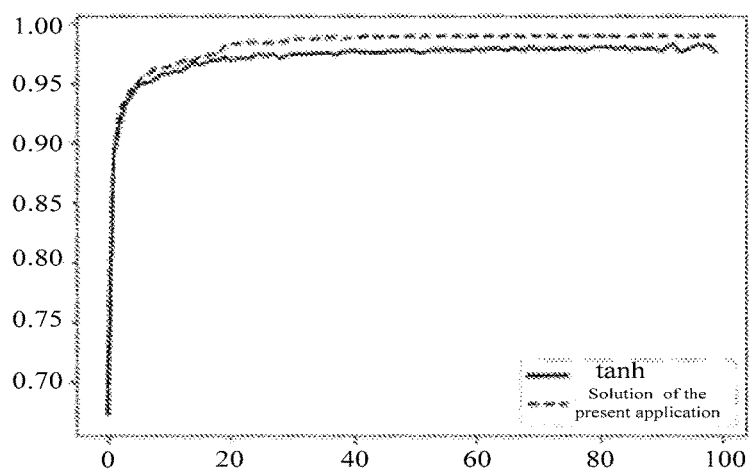
FIG. 4 is a comparison diagram of training with a tanh function and a preset activation function according to the solution of the present application based on a recurrent neural network model according to one or more embodiments of the present application.

Referring to FIG. 4, which is a comparison diagram of training with a tanh function and a preset activation function according to the solution of the present application based on a recurrent neural network model disclosed in the embodiment of the present application. The same recurrent neural network model and the same hyper-parameter are used, the tanh activation function and the preset activation function provided by the solution of the present application are used respectively, that is, $$\phi(x, \alpha, a, b) = \alpha * h(x) + (1-\alpha) * [u(x) + \eta(x)]$$

The model training and testing of the above-mentioned recurrent neural network model are carried out on the MNIST data set. It may be seen from FIG. 4, the convergence speed of the activation function according to the solution of the present application is faster than the original tanh function, and the accuracy of the model is higher than the original tanh function. When the trained model is applied to the same test set for inference, the accuracy of the model using the tanh activation function is 0.9842, and the accuracy of the model using the activation function provided by the present application is 0.9921. It may be seen that, the convergence speed and the accuracy of the model of the solution provided by the present application are better than the original tanh function.

S14: When an image to be recognized is acquired, outputting a recognition result corresponding to the image to be recognized by using the trained neural network model.

It should be pointed out that, the preset activation function provided in the present application may also be applied to other data sets and models, to realize model training and model application, for example weather prediction and the like.

It may be seen that, the embodiment of the present application first acquires the image training sample data set; among them, the image training sample data set includes image training sample data and label information corresponding to the image training sample data, and the preset activation function is constructed from the basic activation function and the preset bias adjustment function in the addition relationship, and the preset activation function is determined as the activation function of the neural network model, to obtain the initial neural network model. Among them, the preset bias adjustment function is the function constructed from the symbol function, the first trainable parameter and the quadratic term in the multiplication relationship, and the image training sample data set is input into the initial neural network model for training until the model converges, to obtain the trained neural network model thereafter, and when the image to be recognized is acquired, the recognition result corresponding to the image to be recognized is output by using the trained neural network model. That is, the activation function adopted by the neural network model in the present application is an activation function with a preset bias adjustment function added on the basis of the basic activation function, and the preset bias adjustment function is a function constructed from the symbol function, the first trainable parameter and the quadratic term in the multiplication relationship. In this way, when the gradient is calculated, a bias linearly proportional to an independent variable is added to the gradient, and since the symbol function is used, the bias is not a negative number, and when the independent variable approaches to both ends, the gradient disappearance may be avoided, thereby the convergence speed of the model and the accuracy of image recognition are improved.

Figure 5:
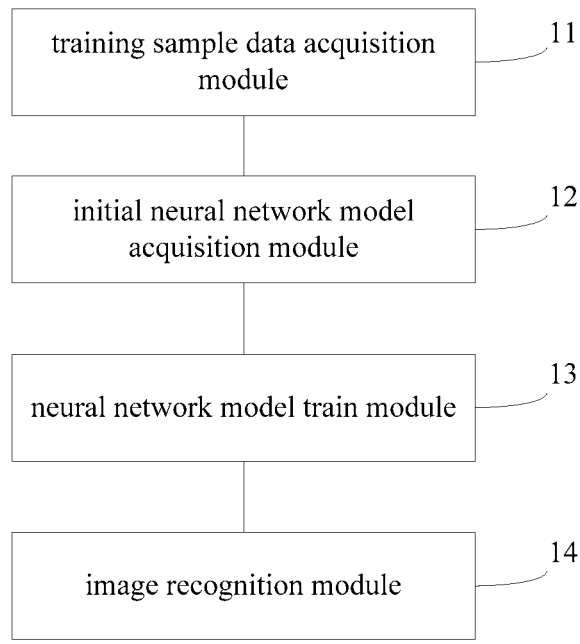
FIG. 5 is a structural schematic diagram of an image recognition apparatus according to one or more embodiments of the present application.

Referring to FIG. 5, an embodiment of the present application discloses an image recognition apparatus, including:

a training sample data acquisition module 11, configured for acquiring an image training sample data set; among them, the image training sample data set includes image training sample data and tag information corresponding to the image training sample data.

An initial neural network model acquisition module 12, configured for constructing a basic activation function and a preset bias adjustment function as a preset activation function in an addition relationship, and determining the preset activation function to be an activation function of a neural network model, to obtain an initial neural network model; among them, the preset bias adjustment function is a function constructed from a symbol function, a first trainable parameter and a quadratic term in a multiplication relationship.

A neural network model train module 13, configured for inputting the image training sample data set into the initial neural network model for training until the model converges, to obtain a trained neural network model; and An image recognition module 14, configured for when an image to be recognized is acquired, outputting a recognition result corresponding to the image to be recognized by using the trained neural network model.

It may be seen that, the embodiment of the present application firstly obtains the image training sample data set; among them, the image training sample data set includes the image training sample data and the label information corresponding to the image training sample data, and the preset activation function is constructed from the basic activation function and the preset bias adjustment function in the addition relationship, and the preset activation function is determined as the activation function of the neural network model, to obtain the initial neural network model. Among them, the preset bias adjustment function is the function constructed from the symbol function, the first trainable parameter and the quadratic term in the multiplication relationship; the image training sample data set is input into the initial neural network model for training until the model converges, to obtain the trained neural network model thereafter; and when the image to be recognized is obtained, the recognition result corresponding to the image to be recognized is output by using the trained neural network model. That is, the activation function adopted by the neural network model in the present application is an activation function with a preset bias adjustment function added on the basis of the basic activation function, and the preset bias adjustment function is a function constructed from the symbol function, the first trainable parameter and the quadratic term in the multiplication relationship. In this way, when the gradient is calculated, a basic linearly proportional to the independent variable is added to the gradient, and since the symbol function is used, the basic is not a negative number, and when the independent variable approaches both ends, the gradient disappearance may be avoided, thereby the convergence speed of the model and the accuracy of image recognition are improved.

Among them, the initial neural network model acquisition module 12, configured for constructing an activation function from the basic activation function, the preset bias adjustment function and a preset linear function in the addition relationship, to obtain the preset activation function; among them, the preset linear function includes a second trainable parameter.

Further, the initial neural network model acquisition module 12, configured for constructing the activation function from the basic activation function, the preset bias adjustment function and the preset linear function in the addition relationship according to a trainable weight parameter, to obtain the preset activation function.

In an embodiment, the preset activation function is:

$$\phi(x, \alpha, a, b) = \alpha * h(x) + (1 - \alpha) * [u(x) + \eta(x)]$$

where h(x) is the basic activation function and u(x) is the preset linear function, η(x) is the preset bias adjustment function, a is the trainable weight parameter, and $$u(x) = b * x + c$$
$$\eta(x) = \text{sign}(x) * a * x^2$$

where, b and c are the second trainable parameters, and a is the first trainable parameter.

Moreover, the basic activation function is a hyperbolic tangent function or a sigmoid function.

The initial neural network model acquisition module 12, configured for determining the preset activation function to be an activation function of a recurrent neural network model, to obtain the initial neural network model.

The apparatus further includes a model evaluation module, configured for:
after the step of, inputting the image training sample data set into the initial neural network model for training until the model converges, to obtain the trained neural network model, the method further includes: acquiring a test data set; inputting the test data set into the trained neural network model, to obtain a test result corresponding to the test data set; and evaluating the accuracy of the trained neural network model by using the test result.

Figure 6:
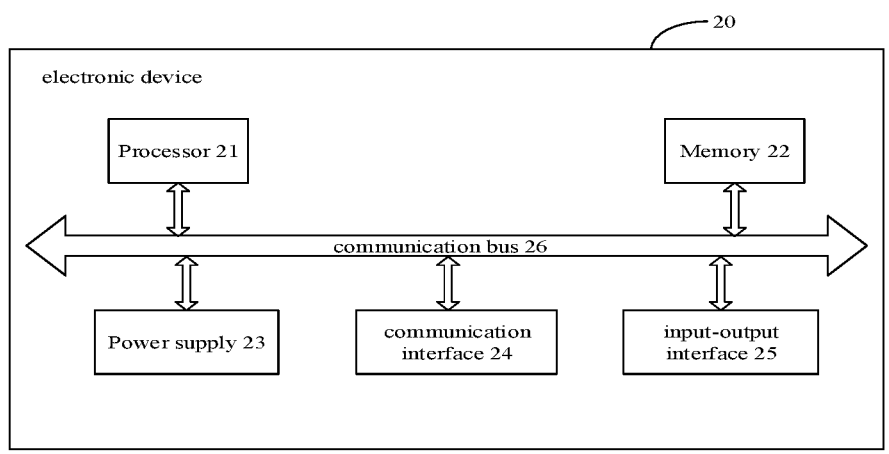
FIG. 6 is a structural schematic diagram of an electronic device according to one or more embodiments of the present application.

Referring to FIG. 6, the embodiment of the present application discloses an electronic device 20, including a memory 22 and one or more processors 21, among them a computer-readable instruction is stored in the memory 22, and the computer-readable instruction, when executed by the one or more processors 21, causes the one or more processors 21 to perform the steps of the method of image recognition of any one of the embodiments above-mentioned.

The process of the above-mentioned method of image recognition may refer to the corresponding contents disclosed in the above-mentioned embodiments, and will not be repeated herein.

Moreover, the memory 22, as a carrier of resource storage, may be a read-only memory, a random access memory, a magnetic disk or an optical disk, and the storage mode may be temporary storage or permanent storage.

In addition, the electronic device 20 further includes a power supply 23, a communication interface 24, an input-output interface 25 and a communication bus 26. Among them, the power supply 23 is used to provide working voltage for every hardware device on the electronic device 20. The communication interface 24 is capable to create a data transmission channel with external devices for the electronic device 20, and the communication protocol and a communication protocol followed by the communication interface 24 is any communication protocol that is capable to be applied to the technical solution of the present application, it is not limited herein. The input-output interface 25, configured to acquire external input data or output data to the outside, and the specific interface type thereof may be selected according to the specific application requirement, which is not limited herein.

Further, the embodiment of the present application further discloses one or more non-transitory computer-readable storage medium storing a computer-readable instruction, where the computer-readable instruction, when executed by one or more processors, causes the one or more processors to perform the steps of the method of image recognition according to any one of the embodiments above-mentioned.

The process of the above-mentioned method of image recognition may refer to the corresponding contents disclosed in the above-mentioned embodiments, and will not be repeated herein.

In the following, in order to make a person skilled in the art fully understand the technical effects of the technical solutions provided in the embodiments of the present application, the problems existing in the related art may be further explained in combination with practical application values.

Figure 7:
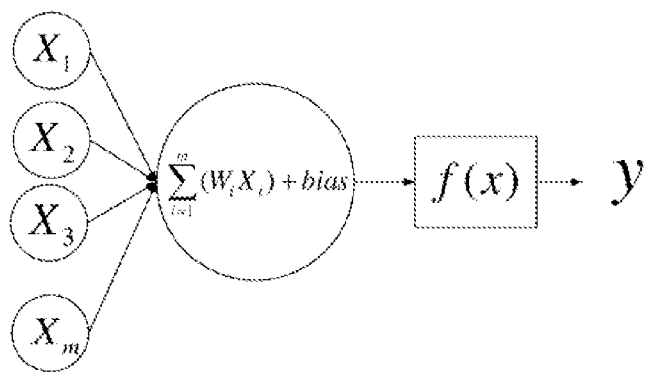
FIG. 7 is a schematic diagram of an activation function according to one or more embodiments of the present application.

The Activation Function is a function added to the artificial neural network, which aims to help a network to learn complex patterns in data. Similar to a neuron-based model in the human brain, the activation function ultimately determines the content to be transmitted to the next neuron. In the artificial neural network, the activation function of one node defines the output of this node under a given input or an input set. A standard computer chip circuit may be regarded as a digital circuit activation function that gets an on (1) or off (0) output according to the input. Consequently, the activation function is a mathematical equation to determine the output of a neural network. The mathematical process of the activation function may be described as shown in FIG. 7, which is a schematic diagram of an activation function according to an embodiment of the present application. As shown in FIG. 7, X represents a sample characteristic, m represents a quantity of the samples, i represents the i-th sample, and the input is X. The operation of every X in a convolution kernel is to multiply its weight by the sample characteristic, and the resulting sums are added to an offset value to obtain the final output. The operation thereof is described as follows:

$$\sum_{i=1}^{m}(W_i X_i) + \text{bias}$$

This output is used as the input of the activation function, the activation function is f(x) in FIG. 7. Through the operation of the activation function, the final output result is y.

It may be seen from the above-mentioned content, in artificial intelligence calculation, the distribution of data is mostly non-linear, while generally the calculation of the neural network is linear, and the activation function is introduced, so that non-linearity is introduced into the neural network, and the learning ability of the network is enhanced. Consequently, a maximum characteristic of the activation function is non-linear.

Although the largest quantity of operations in the Artificial Neural Network (ANN) come from multiplication and addition operations of a Multiply Accumulate (MAC) array, the application of the activation function has the greatest influence on the final operation result accuracy. Different activation functions are applied to different Artificial Intelligence (AI) models, which are suitable for different computing tasks. Two common activation functions are described below:

the Sigmoid function is also called a Logistic function, because the Sigmoid function may be inferred from logistic regression (LR) and is also the activation function specified by a LR model. The value range of the Sigmoid function is between (0,1), and an output of the network may be mapped in this range, which is convenient for analysis. The formula thereof is expressed as:

$$\text{sigmoid}(x) = \frac{1}{1+e^{-x}}$$

The formula of its derivative is expressed as:

$$\text{sigmoid}(x)' = \frac{e^{-x}}{(1+e^{-x})^2}$$

Figure 8:
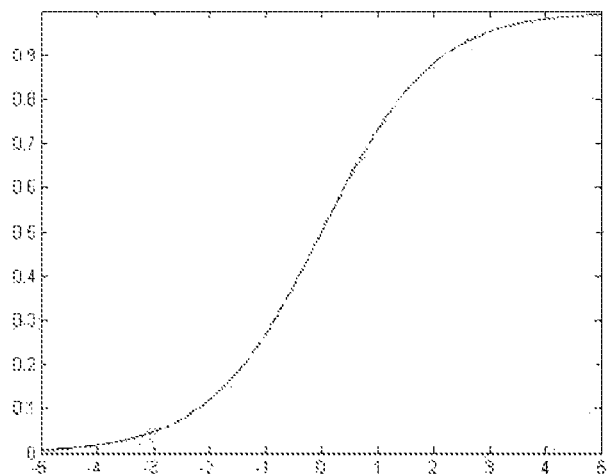
FIG. 8 is a Sigmoid function graph according to one or more embodiments of the present application.
Figure 9:
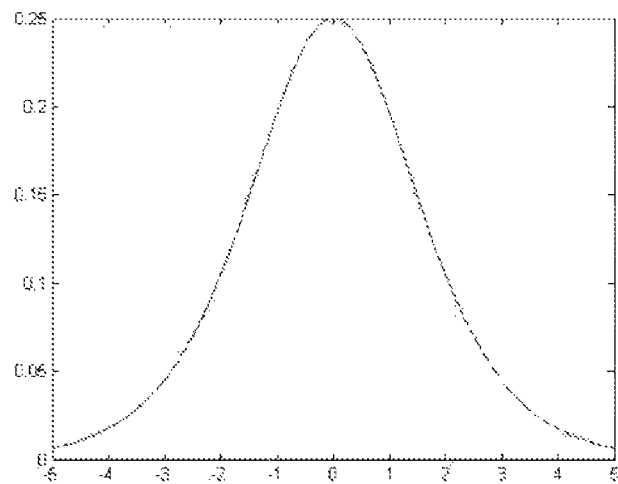
FIG. 9 is a Sigmoid function derivative graph according to one or more embodiments of the present application.

Referring to FIG. 8, which is a Sigmoid function graph according to an embodiment of the present application, and referring to FIG. 9, which is a Sigmoid function derivative graph according to an embodiment of the present application.

As may be seen from above-mentioned, the sigmoid function has the advantages of smoothness and easy of derivation, and solves the problem of continuity of the function and its derivative. However, correspondingly, the sigmoid also has the following shortcomings: 1. the amount of calculation is large; 2. when the error gradient is calculated by back propagation, the derivative operation involves division; 3. the derivatives at both ends are infinitely close to 0, and the gradient may disappear in the operation of a deep level; 4. the function is not symmetrical based on 0, and the distribution characteristic of the data are easily changed when the operation is deepened.

The Tanh is a Hyperbolic Tangent function, which is pronounced hyperbolic tangent in English. The Tanh and the sigmoid are similar, and both belong to saturation activation functions, but the difference lies in that the output range is changed from (0,1) to (−1,1), so that the tanh function may be regarded as a result after the sigmoid downward translation and stretching. The formula thereof is expressed as:

$$\tanh(x) = \frac{e^x - e^{-x}}{e^x + e^{-x}}$$

The formula of its derivative is expressed as:

$$\tanh(x)' = \frac{4e^{-2x}}{(1+e^{-2x})^2}$$

Figure 10:
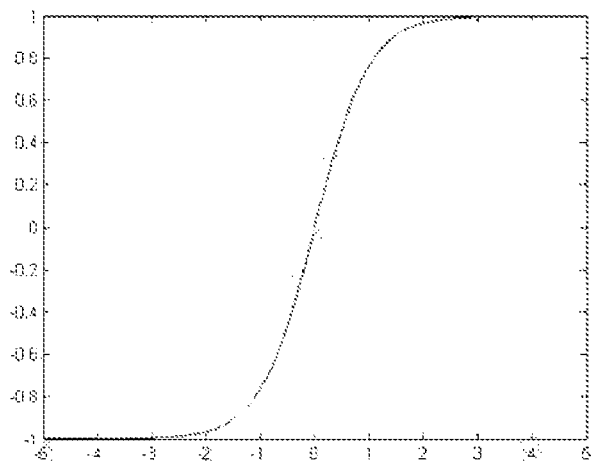
FIG. 10 is a tanh function graph according to one or more embodiments of the present application.
Figure 11:
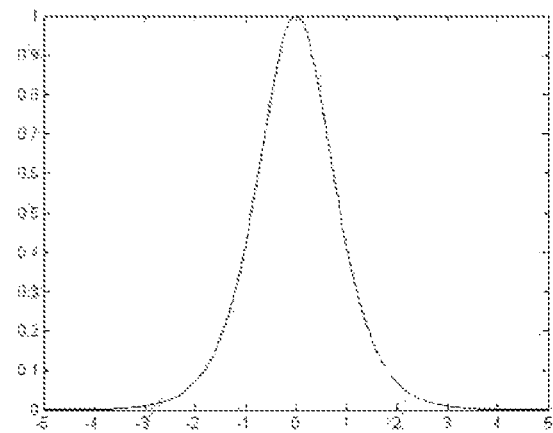
FIG. 11 is a tanh function derivative graph according to one or more embodiments of the present application.

Referring to FIG. 10, which is a tanh function graph according to an embodiment of the present application, and referring to FIG. 11, which is a tanh function derivative graph according to an embodiment of the present application.

It may be seen that, compared with the sigmoid function, the tanh function solves the problem of 0 symmetry, and the derivative graph of the tanh function is steeper, indicating that it has better convergence speed. However, the tanh function still has the following shortcomings: 1. the amount of calculation is large; 2. when the error gradient is calculated by back propagation, the derivative operation involves division; 3. the derivatives at both ends are infinitely close to 0, and the gradient may disappear in the operation of a deep level.

The above two activation functions are most widely used, but those two activation functions still have the obvious disadvantage that the gradient is easy to disappear. The solution provided by the present application may solve the problem of gradient disappearance of this kind of activation function.

Based on the above description of the activation functions, considering the work that the activation function is required to complete in the ANN, a basic characteristic that an activation function needs to meet may be summarized:

1. continuity. The activation function is required to be continuous in its curve and derivative curve (continuous derivative), so that the activation function is capable to show a smooth characteristic. For discontinuous functions, for example Relu, when data falls at its discontinuous points, for example a 0 point, it will have an undesirable characteristic influence on its classification. Since the probability of this falling point varies with the quantity of the discontinuous points of the function, a constructed activation function may accept the discontinuous points, but the quantity is required to be reduced as much as possible.

2. gradient explosion or gradient disappearance. When the weight calculation of the neural network is increasingly deeper into a certain direction with the deepening, the update of its weight will also increase or decrease with the gradient (derivative) of the activation function, so that this update will have a great influence on the data set. When the gradient is increasing, the weight increases exponentially, resulting in the data is too large to be classified correctly. At this time, it is referred to as the gradient explosion. The common gradient explosion may be seen in the Relu. With the increase of the depth of data update, the gradient thereof is continuously increased, which makes it impossible to calculate at last, so that it becomes the gradient explosion. Correspondingly, if the weight decreases gradually with the update of the gradient, which leads to different data cannot be distinguished, it is referred to as the gradient disappearance. The common gradient disappearance exists in the sigmoid and the tanh, since the gradients of sigmoid and tanh at both ends gradually approach zero, so that with the increase of depth, the magnitude caused by its calculation becomes smaller and smaller, and finally the gradient disappearance occurs. According to the existing research conclusions, generally, for an activation function having a gradient less than 0.024, the gradient disappearance situation will occur. In order to solve the problem of gradient disappearance, the common solution used in the industry is to use Gaussian or random distribution at a gradient near-zero end, to make it jitter, and the gradient disappearance is reduced.

3. Saturation. The curve of the activation function itself is saturated when both ends approach 0. The saturation characteristics have a left saturation class and a right saturation class, which indicates that the curve of the activation function approaches zero to the left or approaches zero to the right, respectively. For the problem of the gradient disappearance, if the activation function itself still has an unsaturation characteristic, the problem of "gradient disappearance" may be solved within a certain range, to realize rapid convergence of the activation function.

Figure 12:
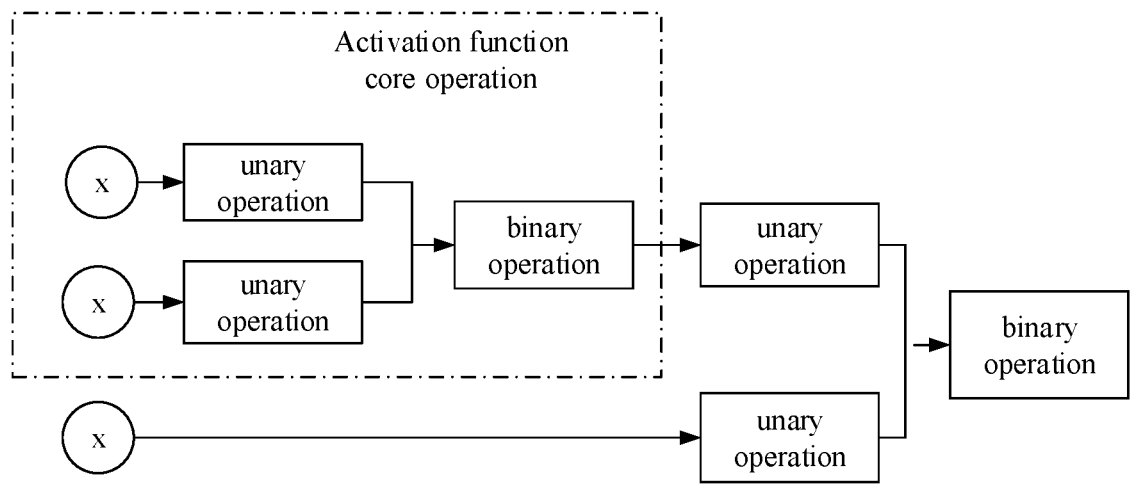
FIG. 12 is a structural schematic diagram of an activation function in the related art.

The configuration of an existing activation function may be constructed according to a core operation unit formed by combining a unary operation and a binary operation, as shown in FIG. 12, FIG. 12 is a structural schematic diagram of an activation function in the related art. As shown in FIG. 12, the research about the activation function divides the activation function into two portions: the unary operation and the binary operation. For different data x, the operations are constantly combined with each other, and finally the activation function is formed, and the operation output for all data is realized. According to the existing successful way of constructing the activation function, the unary operation and the binary operation have the following combinations:

A unary function:

$$x, -x, |x|, x^2, x^3, \sqrt{x}, \beta x, x + \beta, \log(|x| + \alpha),$$
$$\exp(x), \sin(x), \cos(x), \tanh(x), \sinh(x), coh(x) \ldots$$

A binary function:

$$x_1 + x_2, x_1 * x_2, x_1 - x_2, \frac{x_1}{x_2 + \alpha}, \max(x_1, x_2), \exp(x_1) * x_2 \ldots$$

The way to distinguish them is that the operation of the unary function represents a single input and a single output, and the operation of the binary function represents two inputs to get one output. Any activation function may be obtained by using a combination of the unary function and the binary function.

In addition, after a long-term operation, it may be known that, although the unary function and the binary function above-mentioned represent the construction modes of all the activation functions, but the binary function mainly represents the single-output selection situation for multiple inputs. What really affects the continuity, gradient characteristics and saturation of the activation function is mainly determined by the construction characteristic of the unary function.

Based on the universal approximation theorem, it is known that, among a large quantity of the unary functions, a good activation function is required to have a fast gradient descent characteristic near a midpoint, and a gradient gradual gentle characteristic at both ends. Among the unary functions that are capable to meet such squeezing characteristics, merely exp is capable to effectively satisfy them, so that most of the activation functions will use exp to construct the activation functions more or less.

Based on the above description of the characteristics of the activation function, it may be seen that, a good activation function is required to have an obvious gradient change in order to realize rapid classification activation at a near-zero point, that is, the closer to the zero point, the higher the gradient, while the farther away from the zero point, the lower the gradient. However, among the unary functions that are capable to satisfy such squeezing characteristics, merely the exponent exp is capable to effectively satisfy them, so that most of the activation functions will use exp to construct the activation functions more or less. For example, the sigmoid and tanh activation functions. The sigmoid and tanh activation functions all have excellent performances in the neural network, which are a universal activation function, but not an optimal activation function. Moreover, the gradients at both ends of the sigmoid and the gradients at both ends of the tanh gradually approach zero, and therefore, with the increase of depth, the magnitude caused by their calculation becomes smaller and smaller, and finally the gradient disappears. The case of the gradient disappearance is more obvious in the RNN network. The invention of Long-Short Term Memory neural network (LSTM) and Gated Recurrent Unit (GRU) networks is to solve the problem of the gradient disappearance of the RNN. In the present application, from the perspective of the activation function, a method for solving the gradient disappearance of the RNN model is found.

The various embodiments in the present description are described in a progressive way, and every embodiment focuses on the differences from other embodiments, and the same or similar portions between the various embodiments may merely be referred to each other. As for the device disclosed in the embodiment, since it corresponds to the method disclosed in the embodiment, the description is relatively simple, and the relevant portions may merely be referred to the description of the method.

The steps of the method or the algorithm described in connection with the embodiments disclosed herein may be directly implemented by using hardware, a software module executed by a processor, or a combination of the two. The software module may be placed in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field.

An image recognition method, apparatus, device and media provided by the present application are described in detail above. In the present application, the principle and implementation of the present application are described with specific examples. The description of the above embodiments is merely used to help understand the method and its core idea of the present application. At the same time, according to the idea of the present application, there will be changes in the specific implementation and application scope for a person skilled in the art. In summary, the content of the present specification should not be understood as a limitation to the present application.

The invention claimed is:

1. A method of image recognition, comprising:
acquiring an image training sample data set; wherein the image training sample data set comprises image training sample data and tag information corresponding to the image training sample data;
constructing a basic activation function and a preset bias adjustment function as a preset activation function in an addition relationship, and determining the preset activation function to be an activation function of a neural network model, to obtain an initial neural network model; wherein, the preset bias adjustment function is a function constructed from a symbol function, a first trainable parameter and a quadratic term in a multiplication relationship;
inputting the image training sample data set into the initial neural network model for training until the model converges, to obtain a trained neural network model; and
when an image to be recognized is acquired, outputting a recognition result corresponding to the image to be recognized by using the trained neural network model,
wherein, the step of, constructing the basic activation function and the preset bias adjustment function as the preset activation function in the addition relationship, comprises:
constructing the basic activation function, the preset bias adjustment function and a preset linear function as an activation function in the addition relationship, to obtain the preset activation function;
wherein, the preset linear function comprises a second trainable parameter,
wherein, the step of, constructing the basic activation function, the preset bias adjustment function and the preset linear function as the activation function in the addition relationship, to obtain the preset activation function, comprises:
constructing the basic activation function, the preset bias adjustment function and the preset linear function as the activation function in the addition relationship according to a trainable weight parameter, to obtain the preset activation function,
wherein the preset activation function is:

$$\phi(x, \alpha, a, b) = \alpha * h(x) + (1 - \alpha) * [u(x) + \eta(x)]$$

wherein $h(x)$ is the basic activation function, $u(x)$ is the preset linear function, $\eta(x)$ is the preset bias adjustment function, $\alpha$ is the trainable weight parameter, and $$u(x) = b * x + c$$
$$\eta(x) = \text{sign}(x) * a * x^2$$

wherein, b and c are the second trainable parameters, and a is the first trainable parameter.

2. The method of image recognition according to claim 1, wherein the basic activation function is a hyperbolic tangent function or a sigmoid function.

3. The method of image recognition according to claim 1, wherein, the step of, determining the preset activation function to be the activation function of the neural network model, to obtain the initial neural network model, comprises:
determining the preset activation function to be an activation function of a recurrent neural network model, to obtain the initial neural network model.

4. The method of image recognition according to claim 1, wherein, after the step of, inputting the image training sample data set into the initial neural network model for training until the model converges, to obtain the trained neural network model, the method further comprises:
acquiring a test data set;
inputting the test data set into the trained neural network model, to obtain a test result corresponding to the test data set; and
evaluating accuracy of the trained neural network model by using the test result.

5. An electronic device, comprising a memory and one or more processors, wherein a computer-readable instruction is stored in the memory, and the computer-readable instruction, when executed by the one or more processors, causes the one or more processors to perform operations comprising:
acquiring an image training sample data set; wherein the image training sample data set comprises image training sample data and tag information corresponding to the image training sample data;
constructing a basic activation function and a preset bias adjustment function as a preset activation function in an addition relationship, and determining the preset activation function to be an activation function of a neural network model, to obtain an initial neural network model; wherein, the preset bias adjustment function is a function constructed from a symbol function, a first trainable parameter and a quadratic term in a multiplication relationship;
inputting the image training sample data set into the initial neural network model for training until the model converges, to obtain a trained neural network model; and
when an image to be recognized is acquired, outputting a recognition result corresponding to the image to be recognized by using the trained neural network model,
wherein, the step of, constructing the basic activation function and the preset bias adjustment function as the preset activation function in the addition relationship, comprises:
constructing the basic activation function, the preset bias adjustment function and a preset linear function as an activation function in the addition relationship, to obtain the preset activation function;
wherein, the preset linear function comprises a second trainable parameter,
wherein, the step of, constructing the basic activation function, the preset bias adjustment function and the preset linear function as the activation function in the addition relationship, to obtain the preset activation function, comprises:
constructing the basic activation function, the preset bias adjustment function and the preset linear function as the activation function in the addition relationship according to a trainable weight parameter, to obtain the preset activation function,
wherein the preset activation function is:

$$\phi(x,\alpha,a,b)=\alpha*h(x)+(1-\alpha)*[u(x)+\eta(x)]$$

wherein h(x) is the basic activation function, u(x) is the preset linear function, η(x) is the preset bias adjustment function, α is the trainable weight parameter, and $$u(x)=b*x+c$$

$$\eta(x)=\text{sign}(x)*a*x^2$$

wherein, b and c are the second trainable parameters, and a is the first trainable parameter.

6. One or more non-transitory computer-readable storage media storing a computer-readable instruction, wherein the computer-readable instruction, when executed by one or more processors, causes the one or more processors to perform operations comprising:
acquiring an image training sample data set; wherein the image training sample data set comprises image training sample data and tag information corresponding to the image training sample data;
constructing a basic activation function and a preset bias adjustment function as a preset activation function in an addition relationship, and determining the preset activation function to be an activation function of a neural network model, to obtain an initial neural network model; wherein, the preset bias adjustment function is a function constructed from a symbol function, a first trainable parameter and a quadratic term in a multiplication relationship;
inputting the image training sample data set into the initial neural network model for training until the model converges, to obtain a trained neural network model; and
when an image to be recognized is acquired, outputting a recognition result corresponding to the image to be recognized by using the trained neural network model,
wherein, the step of, constructing the basic activation function and the preset bias adjustment function as the preset activation function in the addition relationship, comprises:
constructing the basic activation function, the preset bias adjustment function and a preset linear function as an activation function in the addition relationship, to obtain the preset activation function;
wherein, the preset linear function comprises a second trainable parameter,
wherein, the step of, constructing the basic activation function, the preset bias adjustment function and the preset linear function as the activation function in the addition relationship, to obtain the preset activation function, comprises:
constructing the basic activation function, the preset bias adjustment function and the preset linear function as the activation function in the addition relationship according to a trainable weight parameter, to obtain the preset activation function,
wherein the preset activation function is:

$$\phi(x,\alpha,a,b)=\alpha*h(x)+(1-\alpha)*[u(x)+\eta(x)]$$

wherein h(x) is the basic activation function, u(x) is the preset linear function, η(x) is the preset bias adjustment function, α is the trainable weight parameter, and $$u(x)=b*x+c$$

$$\eta(x)=\text{sign}(x)*a*x^2$$

wherein, b and c are the second trainable parameters, and a is the first trainable parameter.

7. The method of image recognition according to claim 1, wherein the image training sample data set is a MNIST data set, wherein a portion of data of the MNIST data set are used as the image training sample data set, and the other portion of the of the MNIST data set are used as a test set.

8. The method of image recognition according to claim 7, wherein the MNIST data set is a classic small-scale image classification data set, which counts 250 pictures of handwritten numbers from different people.

9. The method of image recognition according to claim 8, wherein the MNIST data set comprises 70,000 pictures of the handwritten numbers, every picture is composed of 28×28 pixels, and every pixel is represented by a grayscale value.

10. The method of image recognition according to claim 9, wherein 60,000 samples of 70,000 pictures of the handwritten numbers is taken as a training data set, and 10,000 samples of 70,000 pictures of the handwritten numbers is taken as a test data set.

11. The method of image recognition according to claim 10, wherein every sample has a corresponding label, which is represented by a single decimal number and corresponds to a corresponding category of the picture.

12. The method of image recognition according to claim 1, wherein in the process of training, a training loss is calculated, and the model is updated based on the loss until the model converges, and the trained neural network model is obtained.

13. The method of image recognition according to claim 1, wherein the activation function is non-linear.

14. The method of image recognition according to claim 1, wherein the activation function is constructed according to a core operation unit formed by combining a unary operation and a binary operation.

15. The method of image recognition according to claim 14, wherein the operation of the unary function represents a single input and a single output, and the operation of the binary function represents two inputs to get one output.

16. The electronic device according to claim 5, wherein the electronic device further comprises:
a power supply, configured to provide working voltage for every hardware device on the electronic device;
a communication interface, configured to create a data transmission channel with external devices for the electronic device;
an input-output interface, configured to acquire external input data or output data to the outside; and
a communication bus.

17. The electronic device according to claim 5, wherein, the operation of, constructing the basic activation function and the preset bias adjustment function as the preset activation function in the addition relationship, comprises:
constructing the basic activation function, the preset bias adjustment function and a preset linear function as an activation function in the addition relationship, to obtain the preset activation function;
wherein, the preset linear function comprises a second trainable parameter.

* * * * *